W. HOPPER.
WAGON GATE.
APPLICATION FILED FEB. 23, 1912.
1,035,011.
Patented Aug. 6, 1912.
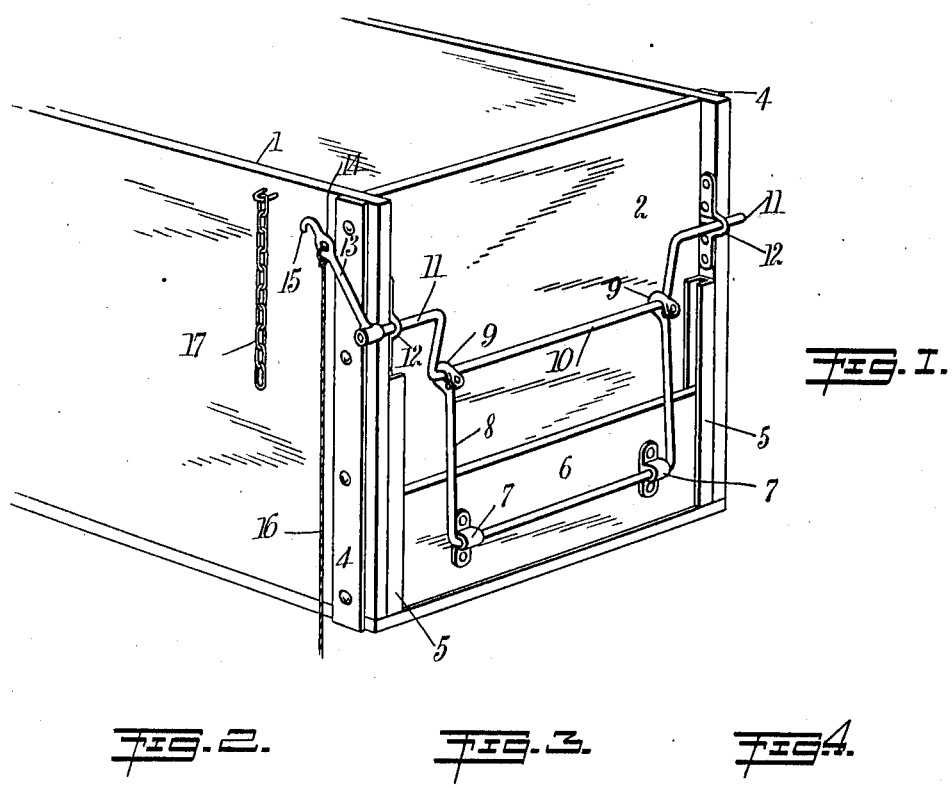
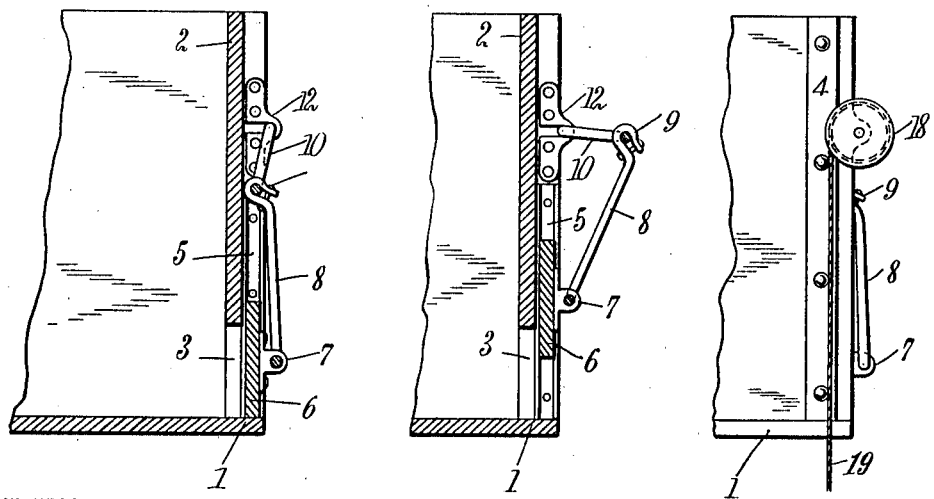
WITNESSES
G. Robert Thomas
Wm. F. Nickel
INVENTOR
William Hopper
BY
ATTORNEYS

UNITED STATES PATENT OFFICE.

WILLIAM HOPPER, OF JEFFERSON, IOWA.

WAGON-GATE.

1,035,011.

Specification of Letters Patent.

Patented Aug. 6, 1912.

Application filed February 23, 1912. Serial No. 679,271.

*To all whom it may concern:*

Be it known that I, WILLIAM HOPPER, a citizen of the United States, and a resident of Jefferson, in the county of Greene and State of Iowa, have invented a new and Improved Wagon-Gate, of which the following is a full, clear, and exact description.

My invention relates to an improvement in wagon gates, and particularly to gates for wagons which are used in hauling and storing grain. The bodies of such wagons often have to be hoisted to deliver the load of grain carried thereby into bins and other compartments formed inside the structures in which the grain is to be stored; and my invention comprises means for readily operating the gates of such wagons after the same have been lifted to permit the grain to be readily discharged therefrom.

Reference is to be had to the accompanying drawings forming a part of this specification, in which the same characters of reference indicate the same parts in all the views.

Figure 1 represents a perspective view of my improved end gate; Fig. 2 is a vertical section passing longitudinally through the wagon, showing the gate in closed position; Fig. 3 is a similar sectional view, showing the gate in raised position; and Fig. 4 is a side elevation of a modification.

On the drawings the numeral 1 represents a wagon body having a rear end 2, which terminates above the floor of the wagon body so as to form a discharge opening 3. The numerals 4 represent strengthening strips secured to the sides adjacent the end edges of the wagon body in the plane of the end 2, as shown in Fig. 1.

The end 2 is spaced a slight distance from the rear edges of the sides of the wagon body, and outside of the end and held in place by the projecting edges of the sides are channel irons 5. These channel irons are secured upon the inner faces of the sides of the wagon body, as shown in Fig. 1, and they form guideways for the gate 6.

The gate 6 has bearings 7, and these bearings receive a U-shaped member 8, the upper ends of the arms of which are bent over as shown at 9, and receive bolts or rivets which hold the bent ends in fixed relation to the body of the arms 8, and form in effect a pair of loops at the ends of these arms. These loops encircle another U-shaped member 10, which is located above the U-shaped member 8, and has the ends of its arms bent outward, as shown at 11. These outwardly-bent ends are pivotally mounted in staples 12, which are in the form of plates secured to the inside faces of the sides 2, adjacent the rear edges thereof, directly above the guides 5.

The extremity of the outwardly-bent ends of these arms carries a crank 13, and this crank 13 has an aperture 14 therethrough near its outer end, and terminates at its outer end in a hook 15. 16 is an operating cord, and 17 is a chain depending from the side of the wagon in position to engage the hook 15, and either prevent the gates 6 from being opened at all, or limiting the amount of such opening.

In operation, after the wagon body has been hoisted and tilted to dump its grain, the cord 16 will be pulled by the operator or attendant, this cord depending within reach of the attendant's hand. The U-shaped member 9 will be rotated counter-clockwise around the outwardly-bent ends 11 of its arms as journals, and the U-shaped member 8 will be lifted in consequence. This will cause the gate to slide upward in the guides 5, which engage the opposite vertical edges thereof, to uncover the opening 3 and allow the grain to run out. When the wagon is emptied the cord is released and the weight of the gate 6 causes the same to drop to close the opening and return the parts to their original position. When the gate is closed the U-shaped member 10 is swung inward as far as the rear end of the body will permit. This moves the parts in the position shown in Fig. 2, and it will be noted that when the parts are thus located with reference to one another, the gate will be locked in closed position, for the reason that direct upward pressure on the gate 6 will then be ineffective to open the gate. This is because the main portion or base of the U-shaped member 10 will lie to the left of a line passing through the ends 11 of this U-shaped member and the main portion or base of the U-shaped member 8. Consequently, any upward pressure on the gate 6 will tend to rotate the U-shaped member 10 clockwise; that is to say, it will tend to hold it more firmly against the outer face of the end 2.

Fig. 4 discloses a modification in which instead of a crank I employ a groove wheel 18, mounted in the extremity of the outwardly-bent ends 11 of the member 10. This groove wheel is wrapped with cord 19, and ordinarily this cord may depend from the wheel when the wagon is not hoisted.
When it is hoisted the gate is opened by the attendant stationed at the top of the hoisting apparatus pulling upon the cord 16, so as to rotate the wheel 18 and the journals 11 in a counter-clockwise direction. As a result, the gate 6 will be lifted as before.

If desired, the cord 19 may be long enough to have its lower end depend within reach of the hand of an operator on the ground when the wagon has been lifted, so as to enable the contents of the wagon to be discharged without an extra attendant stationed at the top of the derrick, as in the case of the form in which the cord 16 is used.

I wish to have it understood that the above description and the drawings accompanying the same are illustrative only, disclosing but one embodiment of my invention; and that I wish to reserve to myself the right to make whatever changes in the shape, size and arrangement of the parts as fairly fall within the scope of the appended claims.

Having thus described my invention, I claim as new and desire to secure by Letters Patent:

1. In an improvement of the kind described, the combination of a wagon body having an opening in its rear end, a slidably-mounted gate to cover and uncover said opening, leverage means including a crank for raising said gate, whereby when the crank is operated, the gate can be lifted, said crank having a hook at its outer end, and flexible means suspended from the side of the wagon body to engage the hook to prevent the opening of said gate or to limit the amount of opening thereof.

2. In an improvement of the kind described, the combination of a wagon body having an opening in its rear end, a slidably-mounted gate to cover and uncover said opening, leverage means including a pivoted crank mounted above the said gate for raising the said gate, and a link connecting said crank to the gate, whereby, when the crank is operated, the gate can be lifted, the said gate being so mounted that its outer surface will be spaced from the rear end of the wagon, whereby the crank and the end of the link connected to the same can be swung inward toward the rear end of the wagon body so as to throw the crank and the link out of alinement with the pivotal point of the crank, and the point of attachment of the link to the gate, to lock the gate in closed position.

In testimony whereof I have signed my name to this specification in the presence of two subscribing witnesses.

WILLIAM HOPPER.

Witnesses:
  A. D. HOWARD,
  E. G. GRAHAM.

---

Copies of this patent may be obtained for five cents each, by addressing the "Commissioner of Patents, Washington, D. C."